(12) United States Patent
Wu et al.

(10) Patent No.: US 11,270,419 B2
(45) Date of Patent: Mar. 8, 2022

(54) AUGMENTED REALITY SCENARIO GENERATION METHOD, APPARATUS, SYSTEM, AND DEVICE

(71) Applicant: TENCENT TECHNOLOGY (SHENZHEN) COMPANY LIMITED, Shenzhen (CN)

(72) Inventors: Yanlin Wu, Shenzhen (CN); Deyuan Li, Shenzhen (CN); Peng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/294,890

(22) Filed: Mar. 6, 2019

(65) Prior Publication Data

US 2019/0206037 A1 Jul. 4, 2019

Related U.S. Application Data

(63) Continuation of application No. PCT/CN2017/107739, filed on Oct. 26, 2017.

(30) Foreign Application Priority Data

Oct. 26, 2016 (CN) .................... 201610949178.X (51) Int. Cl.
*G06T 5/50* (2006.01)
*G06F 3/01* (2006.01)
(Continued)

(52) U.S. Cl.
CPC .............. *G06T 5/50* (2013.01); *A63F 13/211* (2014.09); *A63F 13/213* (2014.09);
(Continued)

(58) Field of Classification Search
CPC ........ G06T 19/006; G06T 2207/20221; G06T 5/50
See application file for complete search history.

(56) References Cited

U.S. PATENT DOCUMENTS

| 6,215,498 B1 * | 4/2001 | Filo ........................ G06F 3/011 345/419 |
| 6,760,134 B1 * | 7/2004 | Schilling .............. G02B 5/1876 356/457 |

(Continued)

FOREIGN PATENT DOCUMENTS

| CN | 1746822 | 3/2006 |
| CN | 103196564 | 7/2013 |

(Continued)

OTHER PUBLICATIONS

"Characteristics of active and passive 2-D holographic scanner imaging systems for the middle infrared", Ih et al., Jun. 15, 1980, Applied Optics, vol. 19, No. 12, pp. 2041-2045.*

(Continued)

*Primary Examiner* — Ryan R Yang
(74) *Attorney, Agent, or Firm* — Oblon, McClelland, Maier & Neustadt, L.L.P.

(57) ABSTRACT

Aspects of the disclosure provide a method, an apparatus and a system for augmented reality. In an example, an apparatus includes an imaging device, processing circuitry and a display device. The imaging device generates a first image of a surrounding environment of the apparatus. The processing circuitry processes first image data of the first image and second image data of a second image to fuse the first image and the second image into a fusion image. The second image includes an object that is not in the surrounding environment. The display device then displays the fusion image.

19 Claims, 7 Drawing Sheets

(51) Int. Cl.

| | |
|---|---|
| *G06T 19/00* | (2011.01) |
| *A63F 13/65* | (2014.01) |
| *A63F 13/537* | (2014.01) |
| *A63F 13/211* | (2014.01) |
| *A63J 1/00* | (2006.01) |
| *A63G 31/00* | (2006.01) |
| *A63F 13/213* | (2014.01) |
| *A63F 13/60* | (2014.01) |
| *A63F 13/837* | (2014.01) |

(52) U.S. Cl.
CPC ............ *A63F 13/537* (2014.09); *A63F 13/60* (2014.09); *A63F 13/65* (2014.09); *A63G 31/00* (2013.01); *A63J 1/00* (2013.01); *G06F 3/011* (2013.01); *G06T 19/006* (2013.01); *A63F 13/837* (2014.09); *G06T 2207/20221* (2013.01)

(56) References Cited

U.S. PATENT DOCUMENTS

| | | | |
|---|---|---|---|
| 9,607,201 B1* | 3/2017 | Schafer | G06Q 30/06 |
| 9,646,417 B1* | 5/2017 | Sowadski | G06F 3/0346 |
| 10,026,228 B2* | 7/2018 | Yuen | G06T 19/20 |
| 2005/0168486 A1 | 8/2005 | Sato et al. | |
| 2006/0050070 A1 | 3/2006 | Matsui | |
| 2011/0241934 A1* | 10/2011 | Sarkis | G03H 1/0443 |
| | | | 342/191 |
| 2014/0049491 A1* | 2/2014 | Nagar | G06F 3/016 |
| | | | 345/173 |
| 2017/0249021 A1* | 8/2017 | Henrique Barbosa Postal | |
| | | | G02B 27/017 |
| 2017/0256040 A1* | 9/2017 | Grau | H04N 1/00196 |
| 2017/0301137 A1 | 10/2017 | Luo et al. | |
| 2017/0323489 A1* | 11/2017 | Clement | G06T 13/40 |
| 2018/0101994 A1* | 4/2018 | Da Veiga | G06F 3/0486 |
| 2019/0056693 A1* | 2/2019 | Gelman | G06T 19/006 |

FOREIGN PATENT DOCUMENTS

| | | |
|---|---|---|
| CN | 103593514 | 2/2014 |
| CN | 104270577 | 1/2015 |
| CN | 104539925 | 4/2015 |
| CN | 105786432 | 7/2016 |
| CN | 105955456 | 9/2016 |
| CN | 106383587 | 2/2017 |

OTHER PUBLICATIONS

International Search Report dated Jan. 31, 2018 in PCT/CN2017/107739 filed Oct. 26, 2017. (With English Translation).
Written Opinion dated Jan. 25, 2018 in PCT/CN2017/107739 filed Oct. 26, 2017. (With English Translation).
Office Action dated Apr. 20, 2018 in Chinese Patent Application No. 201610949178.X (With Concise English Translation).
Office Action dated Jan. 17, 2018 in Chinese Patent Application No. 201610949178.X (With Concise English Translation).

* cited by examiner

AUGMENTED REALITY SCENARIO GENERATION METHOD, APPARATUS, SYSTEM, AND DEVICE

RELATED APPLICATION

This application is a continuation of International Application No. PCT/CN2017/107739, filed on Oct. 26, 2017, which claims priority to Chinese Patent Application No. 201610949178.X, filed with the Chinese Patent Office on Oct. 26, 2016 and entitled "AUGMENTED REALITY SCENE GENERATION METHOD, DEVICE, SYSTEM AND EQUIPMENT". The entire disclosures of the prior applications are incorporated by reference herein in their entirety.

FIELD OF THE TECHNOLOGY

The present disclosure relates to the field of computers, and in particular, to augmented reality scenario generation technology.

BACKGROUND OF THE DISCLOSURE

Augmented reality (AR) is a technology of calculating a location and an angle of a camera image in real time and adding a corresponding image, and has an objective of covering the real world with a virtual world on a screen and performing interaction. The AR technology may be applied to various application scenarios, for example, may be applied to an augmented reality game.

In an augmented reality game in the related technology, an augmented reality scenario is generated by scanning a particular target, and a virtual object in a gaming process is presented in the augmented reality scenario. For example, the game is an AR card game or an AR Magic Cards game. In most games of this type, playing methods may all be that a card is placed on a desktop, an augmented reality scenario is generated after the card is identified, and a game player may interact with a virtual object in the augmented reality scenario by using a terminal screen. However, the game player needs to keep a terminal pointing to the cards on the desktop at any moment in a gaming process, so that the terminal can display the augmented reality scenario generated based on the card.

In the related technology, an augmented reality scenario is generated by scanning a particular target, and therefore a game scenario in an augmented reality game is not rich and does not provide a strong vicarious and presence feeling.

SUMMARY

Embodiments of the present disclosure provide an augmented reality scenario generation method, apparatus, and system, and can generate an augmented reality scenario based on a reality scenario, so that the generated scenario is richer, and provides an enhanced vicarious and presence feeling.

Aspects of the disclosure provide a method, an apparatus and a system for augmented reality. In an example, an apparatus includes an imaging device, processing circuitry and a display device. The imaging device generates a first image of a surrounding environment of the apparatus. The processing circuitry processes first image data of the first image and second image data of a second image to fuse the first image and the second image into a fusion image. The second image includes an object that is not in the surrounding environment. The display device then displays the fusion image.

In an embodiment, the imaging device is a camera that takes the first image of the surrounding environment. In another embodiment, the imaging device is a holographic scanner that scans the surrounding environment to generate the first image data of the first image.

In some embodiments, the processing circuitry obtains an environment parameter that is indicative of a display mode. Then, the processing circuitry renders the first image according to the display mode to obtain a rendered image and superimposes the rendered image over the second image to obtain the fusion image.

In an example, the processing circuitry obtains an environment parameter that is indicative of an infrared mode. In the infrared mode, the processing circuitry converts the first image into a grayscale image. Then, the processing circuitry determines respective first heat values of first pixels in the grayscale image based on first grayscale values of the first pixels in the grayscale image. Further, the processing circuitry performs a first color adjustment on the grayscale image based on the first heat values of the first pixels to obtain a rendered image. The first color adjustment converts a relatively higher heat value to a color of a relatively higher color temperature. In addition, the processing circuitry superimposes the rendered image with the second image to obtain the fusion image.

In some embodiments, the processing circuitry scales down the grayscale image based on a scale to obtain a temporary image. Further, the processing circuitry determines respective second heat values of second pixels in the temporary image based on second grayscale values of the second pixels in the temporary image. Then, the processing circuitry performs a second color adjustment on the temporary image based on the second heat values of the second pixels, and scales up the color-adjusted temporary picture based on the scale, to obtain the rendered image.

In another example, the processing circuitry obtains an environment parameter that is indicative of a night vision mode. In the night vision mode, the processing circuitry obtains a central pixel of the first image, and calculates distances between pixels in the first image and the central pixel. Further, the processing circuitry sets respective distortion degrees of the pixels based on the distances to obtain a distorted image. The distortion degrees are positively correlated to the distances. Then, the processing circuitry processes the distorted image according to an algorithm similar to green-lens to obtain a greened image. In addition, in an example, the processing circuitry adds a random noise to the greened image to generate the rendered image.

In some embodiments, the processing circuitry receives rotation data that is detected by a gyroscope, and updates the second image to adjust a rotation of the object representing a virtual role based on the rotation data.

Aspects of the disclosure also provide a non-transitory computer-readable medium storing instructions which when executed by a computer cause the computer to perform the method for augmented reality.

It can be learned from the foregoing technical solutions that:

In the embodiments of the present disclosure, a particular target image does not need to be identified; and any reality scenario image in a realistic environment is acquired by using an image acquirer, and the reality scenario image is fused with a pre-generated virtual scenario image, to generate a fusion image. In the present disclosure, a virtual scenario having a virtual object and a virtual role is generated in a background that is based on the reality environment; therefore a generated augmented reality scenario is richer, and provides a stronger vicarious and presence feeling.

DESCRIPTION OF EMBODIMENTS

To make technical solutions and beneficial effects of the present disclosure clearer, the following further describes the present disclosure in detail with reference to the accompanying drawings and embodiments. It is understood that the specific embodiments described herein are merely used to explain the present disclosure but are not intended to limit the present disclosure.

It is noted that, the technical solution in the embodiments of the present disclosure may be applied to various scenarios, including a game that is based on a real scenario, an entertainment that is based on a real scenario, a spot description for tourism or an exhibition, and the like.

Figure 1:
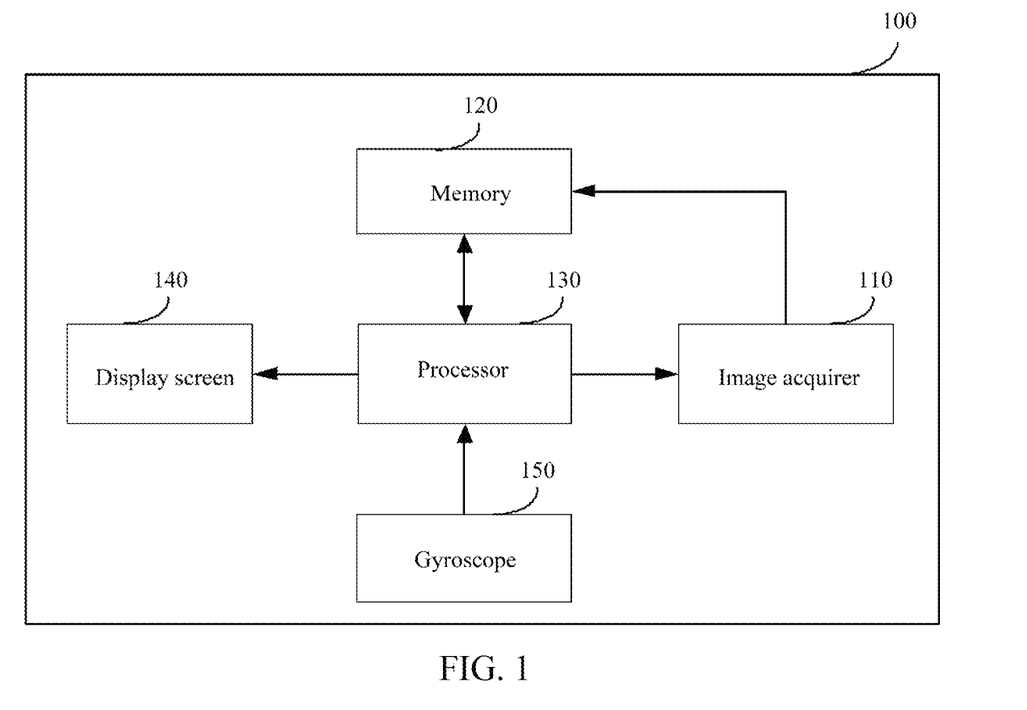
FIG. 1 is a diagram of composition and information exchange between modules of an augmented reality game system according to an embodiment of the present disclosure.

An embodiment of the present disclosure provides an architectural diagram of an application scenario of an augmented reality scenario generation method, as shown in FIG. 1. An augmented reality scenario generation system 100 includes at least the following several components: an image acquirer 110, a memory 120, a processor 130, and a display screen 140.

The image acquirer 110 is configured to acquire a reality scenario image, and may be a camera, or may be a holographic scanner.

The memory 120 is store the reality scenario image acquired by the image acquirer, and may be further configured to temporarily store data generated in a process of performing a program or store data entered by a user.

The processor 130 is configured to: obtain, from the memory 120, the reality scenario image acquired by the image acquirer 110, and fuse the reality scenario image with a pre-generated virtual scenario image, to obtain a fusion image. The virtual scenario image includes a virtual object image and/or a virtual role image, and is generated by the processor 130.

The display screen 140 is configured to display the fusion image generated by the processor 130.

The reality scenario image acquired by the image acquirer 110 in this embodiment of the present disclosure varies based on a reality scenario in which the user is located. The virtual scenario image generated by the processor 130 may be generated in real time, and varies in real time based on the reality scenario in which the user is located. Therefore, the fusion image that is output on the display screen 140 also varies in real time.

It is noted that, the augmented reality scenario generation system in the present disclosure may further include a gyroscope 150. The gyroscope 150 may obtain rotation data of the user, and send the rotation data to the processor 130, so that the processor 130 may synchronize a real rotation of the user to a virtual role in the virtual scenario image based on the rotation data that is of the user and that is acquired by the gyroscope 150, thereby being capable of improving immersive experience of the user.

In some implementations, the augmented reality scenario generation system in the present disclosure may further include a touch screen. The touch screen is configured to provide a location value of a touch of the user on the screen. During specific implementation, the touch screen receives interaction information entered by the user, converts the interaction information entered by the user into an operation instruction, and sends the operation instruction to the processor 130. The processor 130 controls interaction between a virtual object and a virtual role in a virtual scenario.

In some implementations, the touch screen and the display screen may be integrated into a touch display screen.

It is noted that, the augmented reality scenario generation system in this embodiment of the present disclosure may exist in a form of user equipment (such as a mobile phone or a tablet computer), or may exist in a form of a plurality of physical devices, for example, through a combination between a wearable device and a projector, or a combination between a handheld device and a projector. An existence form in actual application is not limited in the present disclosure.

Figure 2:
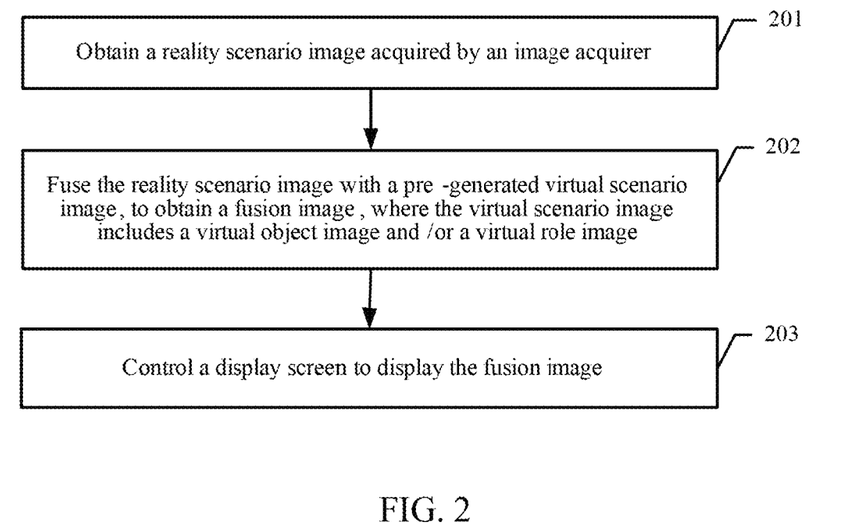
FIG. 2 is a flowchart of an augmented reality scenario generation method according to an embodiment of the present disclosure.

The following describes a procedure of an augmented reality scenario generation method according to an embodiment of the present disclosure. The method may be performed by the processor 130 in the augmented reality scenario generation system shown in FIG. 1. The procedure of the method includes:

201: A processor obtains a reality scenario image acquired by an image acquirer.

In an exemplary implementation, the image acquirer may be a camera. A scenario picture or a scenario video in the real world is shot by using the camera, the scenario picture or each frame of the scenario video is used as a reality scenario image, and then the reality scenario image is sent to a memory for storage. The processor may obtain, from the memory, the reality scenario image acquired by the camera.

In another exemplary implementation, the image acquirer may be a holographic scanner. The real world is scanned by using the holographic scanner, to obtain a holographic picture. The holographic picture is used as a reality scenario image, and then the reality scenario image is sent to the memory for storage. The processor may obtain, from the memory, the reality scenario image acquired by the holographic scanner.

In some possible implementations, the reality scenario image obtained by the processor may be a scenario picture that is obtained by the camera by shooting the real world in advance or each frame of picture of a scenario video, or may be a holographic picture that is obtained by the holographic scanner by scanning the real world in advance. That is, the reality scenario image obtained by the processor may alternatively be a reality scenario image that is already acquired by the image acquirer in advance.

It may be understood that the image acquirer may acquire a reality scenario image in advance, and save the acquired reality scenario image to the memory. When needing to obtain a reality scenario image, the processor may directly obtain the reality scenario image from reality scenario images that are already stored in the memory, and the image acquirer does not need to acquire the reality scenario image from the real world in real time, thereby improving augmented reality scenario generation efficiency.

202: The processor fuses the reality scenario image with a pre-generated virtual scenario image, to obtain a fusion image, where the virtual scenario image includes a virtual object image and/or a virtual role image.

In an implementation, the processor may generate a corresponding virtual scenario image based on the obtained reality scenario image. The virtual scenario image may include a virtual object image and/or a virtual role image. The processor fuses the obtained reality scenario image with the generated virtual scenario image, to obtain a fusion image.

In actual application, the processor may analyze the obtained reality scenario image, and generate the virtual object image in the virtual scenario image based on an element in the reality scenario image.

Figure 3:
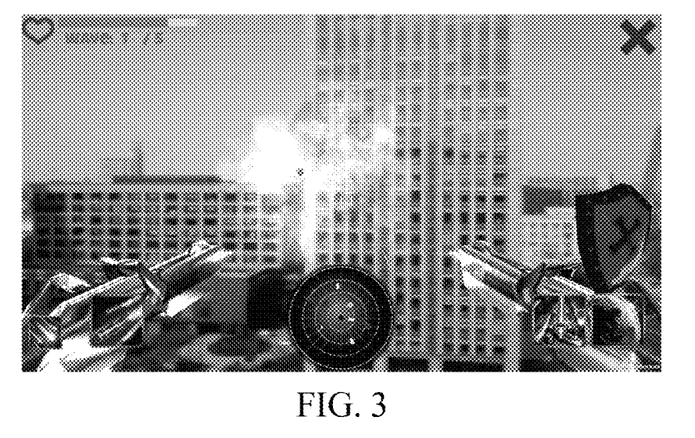
FIG. 3 is a schematic diagram of a fusion image effect according to an embodiment of the present disclosure.

For example, if the reality scenario image is a city building image shown in FIG. 3, generated virtual object images may be various flying saucer images; if the reality scenario image is an indoor picture image, generated virtual object images may be various pet images; if the reality scenario image is a wide outdoor scene image, generated virtual object images may be various eidolon images; if the reality scenario image is a flower image presented in macro mode, generated virtual object images may be various insect images.

The virtual role image may be a person role or a thing that may represent a user identity in a virtual world. For example, the virtual role images may be every type of person in a virtual world, or may be the machine gun in the virtual world shown in FIG. 3.

In this embodiment of the present disclosure, the processor may analyze the reality scenario image, to generate the virtual role image. For example, if the reality scenario image is a space image, a plane image may be generated as the virtual role image; if the reality scenario image is the city building image shown in FIG. 3, a machine gun image may be generated as the virtual role image.

In another implementation, the virtual scenario image may alternatively be pre-generated by the processor based on a requirement of a user.

203: The processor controls a display screen to display the fusion image.

After obtaining the fusion image, the processor may send the fusion image to the display screen, and display the fusion image on the display screen.

In some implementations, to further enrich a generated augmented reality scenario, the processor may further render the reality scenario image based on an obtain environment parameter, to obtain a rendered image. Then, the rendered image is superimposed over the virtual scenario image, to obtain the fusion image. Finally the fusion image is sent to the display screen, and the display screen displays the fusion image to the user.

The environment parameter obtained by the processor is specifically used for indicating a rendering mode. The processor may render the reality scenario image based on the rendering mode indicated by the environment parameter.

In addition, before rendering the reality scenario image, the processor needs further to obtain the environment parameter. Therefore, this embodiment provides the following two examples of obtaining the environment parameter:

In an example, the environment parameter may be entered by the user. In actual application, after receiving the environment parameter entered by the user, the processor uses the environment parameter to render the reality scenario image. In addition, a plurality of environment parameters may be preset in the system, and the processor may receive any environment parameter selected by the user, and use the environment parameter as the environment parameter for rendering the reality scenario image.

In another example, the environment parameter may be further extracted from the reality scenario image. In actual application, the processor may analyze the reality scenario image, and then extract the environment parameter from the reality scenario image. For example, when the reality scenario image is a night scene image, the processor may extract the environment parameter that indicates a night vision mode from the night scene image.

In actual application, rendering modes indicated by the environment parameter may include but are not limited to an infrared mode, a night vision mode, a cartoon mode, and a sketch mode. The following separately describes the various rendering modes:

(1) When the environment parameter indicates the infrared mode, the processor may perform infrared thermal rendering on the reality scenario image.

Figure 5:
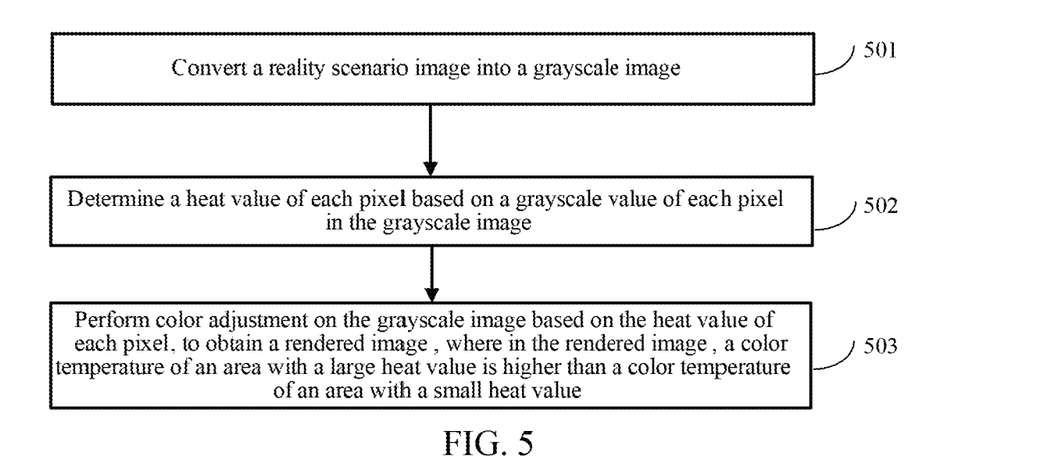
FIG. 5 is a flowchart of rendering of an infrared special effect according to an embodiment of the present disclosure.

In actual application, such as an example shown in FIG. 5, a method of performing, by the processor, infrared thermal rendering on the reality scenario image may include:

501: The processor converts a reality scenario image into a grayscale image.

502: The processor determines a heat value of each pixel based on a grayscale value of each pixel in the grayscale image.

503: The processor performs color adjustment on the grayscale image based on the heat value of each pixel, to obtain a rendered image, where in the rendered image, a color temperature of an area with a large heat value is higher than a color temperature of an area with a small heat value.

In actual application, the processor may further adjust the heat value based on an actual requirement of the user. For example, when requiring a visual effect with a relatively low color temperature, the user may trigger an operation of reducing the heat value, and after detecting the operation, the processor adjusts a color of the grayscale image based on the reduced heat value, to obtain the rendered image.

Figure 4:
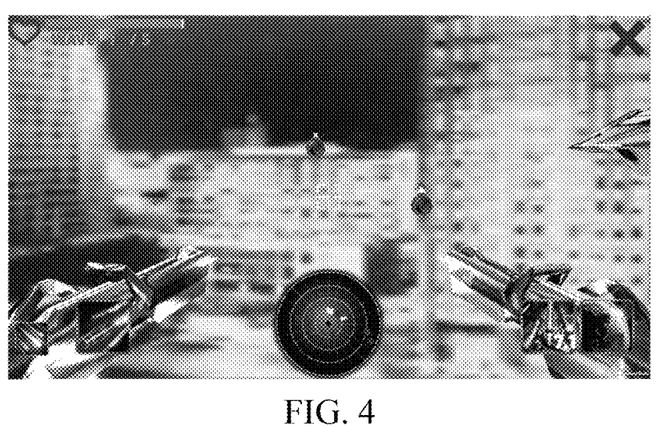
FIG. 4 is a schematic diagram of a rendering effect of an infrared special effect according to an embodiment of the present disclosure.

In this embodiment of the present disclosure, an infrared thermal rendering method in actually a method of generating a heat value corresponding to an image based on a grayscale value of the image, and then adjusting a color of the image based on the heat value. As shown in FIG. 4, FIG. 4 is a schematic diagram of a fusion image on which infrared thermal rendering has been performed. It may be understood that, an image on which the infrared thermal rendering has been performed can bring a visual thermal effect to a user, so that a generated fusion image is richer.

In some implementations, before the rendered image is obtained, the grayscale image may be scaled down, to reduce a rendering area and increase a rendering speed; and after the rendered image is obtained, the grayscale image is scaled up. Correspondingly, this embodiment of the present disclosure provides another method of performing infrared thermal rendering on a reality scenario image, including:

converting the reality scenario image into a grayscale image;

scaling down the grayscale image based on a preset scale, to obtain a temporary picture;

determining a heat value of each pixel based on a grayscale value of each pixel in the grayscale image;

performing color adjustment on the grayscale image based on the heat value of each pixel; and scaling up the grayscale image based on the preset scale, to obtain a rendered image, wherein in the rendered image, a color temperature of an area with a large heat value is higher than a color temperature of an area with a small heat value.

It is noted that, the step of scaling down the grayscale image may alternatively be performed after the step of determining a heat value of each pixel. In this embodiment, a sequence in which the two steps of scaling down the grayscale image and determining a heat value of each pixel are performed is not limited.

(2) When the environment parameter indicates the night vision mode, the processor may perform night vision rendering on the reality scenario image.

Figure 7:
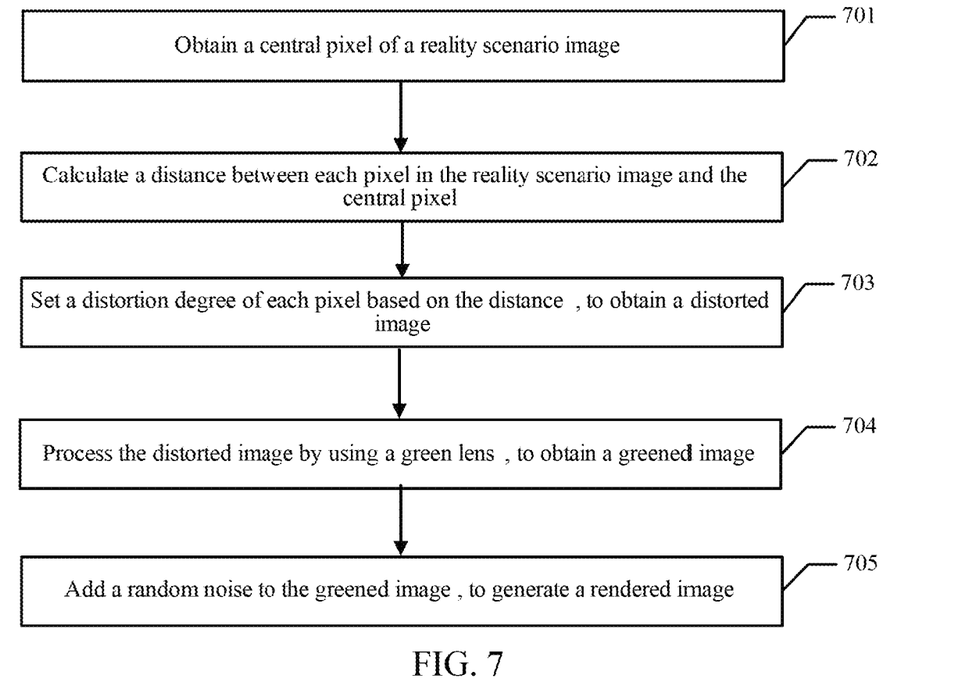
FIG. 7 is a flowchart of rendering of a night vision special effect according to an embodiment of the present disclosure.

In actual application, as another example, a procedure of performing night vision rendering on the reality scenario image is shown in FIG. 7. A night vision rendering method may include:

701: Obtain a central pixel of a reality scenario image.

702: Calculate a distance between each pixel in the reality scenario image and the central pixel.

703: Set a distortion degree of each pixel based on the distance, to obtain a distorted image, where the distortion degree of each pixel is positively related to the distance between the pixel and the central pixel.

704: Process the distorted image by using a green lens, to obtain a greened image.

705: Add a random noise to the greened image, to generate a rendered image.

Figure 6:
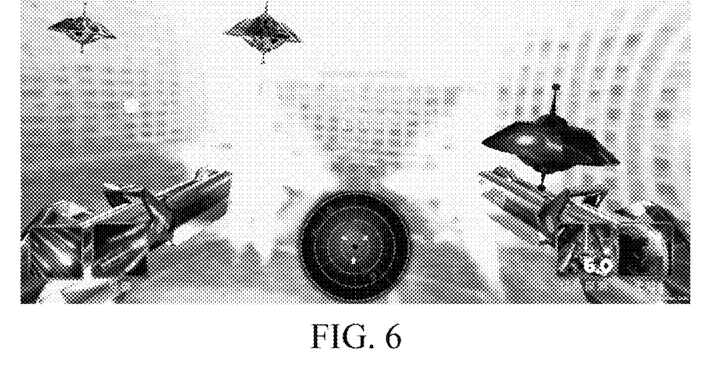
FIG. 6 is a schematic diagram of a rendering effect of a night vision special effect according to an embodiment of the present disclosure.

In this embodiment of the present disclosure, to obtain a rendered image with a night vision effect, a distortion effect may be produced on the reality scenario image based on the distance between each pixel and the central pixel of the reality scenario image, and greening processing may be performed on the reality scenario image. To further improve authenticity of the night vision effect, a random noise may be further added to the reality scenario image, to finally obtain a rendered image with a simulated night vision effect. As shown in FIG. 6, FIG. 6 is a schematic diagram of a fusion image on which night vision rendering has been performed according to an embodiment of the present disclosure.

(3) When the environment parameter indicates the cartoon mode, the processor performs cartoon special effect rendering on the reality scenario image.

When the environment parameter indicates the cartoon mode, the processor performs cartoon special effect rendering on the reality scenario image to obtain a rendered image, and superimposes the rendered image over a virtual scenario image, to obtain a fusion image.

(4) When the environment parameter indicates the sketch mode, the processor performs sketch special effect rendering on the reality scenario image. When the environment parameter indicates the sketch mode, the processor performs sketch rendering on the reality scenario image to obtain a rendered image, and superimposes the rendered image over a virtual scenario image, to obtain a fusion image.

To improve an immersion feeling of a user, a true action of the user may be synchronized with a virtual role image. Rotation data of a gyroscope can reflect a rotation action of the user to an extent. Therefore, the processor may complete an update of the virtual role image based on the rotation data of the gyroscope.

In actual application, a gyroscope assembly generates rotation data that can reflect a rotation of a user, and sends the rotation data to the processor. The processor applies the same rotation data to a virtual role image controlled by the user, to generate a virtual scenario image, thereby completing an update of the original virtual scenario image, so that in a real scenario, a rotation of a user is consistent with a rotation of a virtual role image, and then a real rotation of the user may be synchronized to a virtual role image in a virtual scenario image.

In this embodiment, the processor obtains the reality scenario image acquired by the image acquirer, and fuses the reality scenario image with the pre-generated virtual scenario image, to obtain the fusion image and display the fusion image. It can be learned that, in this embodiment of the present disclosure, a particular target image does not need to be identified, but a reality scenario image in the real world is acquired and a virtual scenario image with a virtual object and\or a virtual role is generated on the reality scenario image, so that the generated reality scenario image can be richer, thereby enhancing a vicarious and presence feeling, and improving immersive experience.

Figure 8:
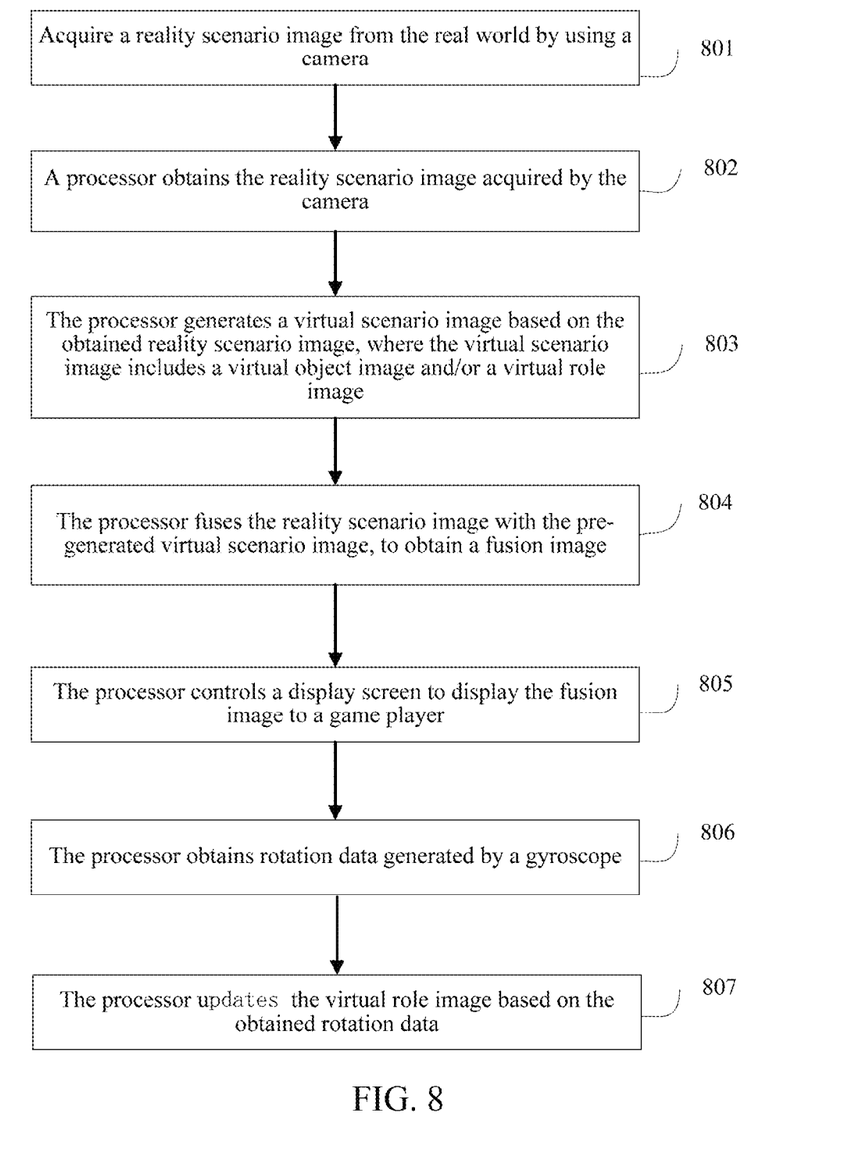
FIG. 8 is a flowchart of an augmented reality scenario generation method according to an embodiment of the present disclosure.

To better understand the present disclosure, the following describes a technical solution of the present disclosure in detail by using an AR game as an example. Refer to FIG. 8 at the same time.

FIG. 8 is a schematic flowchart of an augmented reality scenario generation method of an AR game according to an embodiment of the present disclosure. The method includes:

801: Acquire a reality scenario image from the real world by using a camera of an AR game terminal.

In actual application, when an AR game is being run, a scenario picture or a scenario video in the real world may be shot by using the camera of the terminal, and the scenario picture or each frame of picture of the scenario video may be used as the reality scenario image.

802: A processor obtains the reality scenario image acquired by the camera.

Generally, the reality scenario image acquired by the camera is stored to a memory. When needing to obtain the reality scenario image acquired by the camera, the processor may read the required reality scenario image from the memory.

803: The processor generates a virtual scenario image based on the obtained reality scenario image, where the virtual scenario image includes a virtual object image and/or a virtual role image.

The virtual role image in the virtual scenario image is a role image controlled by a player in an AR game, and may be a person role image or a thing that represents an identity of the player, such as the gun shown in FIG. 3. The virtual object image may be an object image other than the virtual role image in the game, for example, a virtual bullet image, a virtual animal image, or a radar image.

The virtual scenario image may be generated by the processor. In actual application, specifically the virtual scenario image may be generated by the processor by using a game engine.

The game engine refers to some editable computer game systems that have already been compiled, or some core assemblies of an interactive real-time image application programs, and provides various tools required by a game designer to compile a game. An objective of the game engine is to enable the game designer to easily and quickly make a game program without a need to start from scratch.

804: The processor fuses the reality scenario image with the pre-generated virtual scenario image, to obtain a fusion image.

805: The processor controls a display screen to display the fusion image to a game player.

After obtaining the fusion image, the processor may send the fusion image to the display screen, and display the fusion image on the display screen.

806: The processor obtains rotation data generated by a gyroscope.

When the player rotates, the gyroscope can sense the rotation of the player, generate the rotation data that can reflect the rotation of the player, and send the rotation data to the processor. The processor obtains the rotation data generated by the gyroscope.

807: The processor updates the virtual role image based on the obtained rotation data.

Based on the obtained rotation data, the processor applies the same rotation data to the virtual role image controlled by the player, to generate a new virtual scenario image, and updates the original virtual scenario image by using the generated virtual scenario image, so that a rotation of the AR game player in the real world is consistent with a rotation of a virtual role image controlled by the player in a virtual world, and then the real rotation of the player in the real world may be synchronized to the virtual role image in the virtual scenario image.

In addition, the player may further trigger an AR game operation instruction by using an interaction device (such as a touch screen, a mouse, or a keyboard). The processor receives the AR game operation instruction, generates a new virtual scenario image in real time by using the game engine, and updates the original virtual scenario image, thereby controlling interaction between a virtual object and a virtual role in a virtual scenario, and achieving a game effect such as shooting, reviving, or skill releasing.

As shown in FIG. 6, in a process in which the player plays the AR game, the player needs to observe radar displayed on the display screen, look for a flying saucer through a rotation, and destroy the flying saucer. A game scenario varies based on a movement or a rotation of the body of the player. A special effect is added to the reality scenario image acquired by the image acquirer, and then the reality scenario image is displayed on the display screen.

In this embodiment, the processor obtains the reality scenario image acquired by the camera, and fuses the reality scenario image with the pre-generated virtual scenario image, to obtain the fusion image and control the display screen to display the fusion image. It can be learned that, in this embodiment of the present disclosure, a particular target image does not need to be identified, but a reality scenario image in the real world is acquired and a virtual scenario image with a virtual object and\or a virtual role is generated on the reality scenario image, so that the generated reality scenario image can be richer, thereby enhancing a vicarious and presence feeling, and improving immersive experience.

The foregoing describes the augmented reality scenario generation system and the procedure of the augmented reality scenario generation method in the embodiments of the present disclosure. The following describes an augmented reality scenario generation apparatus in an embodiment of the present disclosure from a perspective of a functional module.

Figure 9:
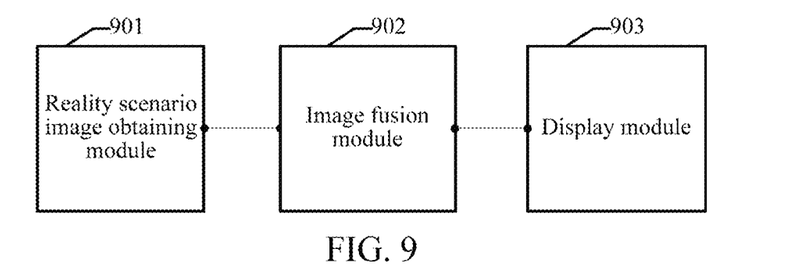
FIG. 9 is a schematic structural diagram of functional modules of an augmented reality scenario generation apparatus according to an embodiment of the present disclosure.

As shown in FIG. 9, an embodiment of the present disclosure further provides an augmented reality scenario generation apparatus, to specifically implement the functions implemented by the augmented reality scenario generation method corresponding to (FIG. 1 to FIG. 7). The functions may be implemented by using hardware, or may be implemented by using hardware to perform a corresponding software program. The hardware and software include one or more unit modules corresponding to the foregoing functions, and the unit modules may be software and/or hardware.

Specifically the following several functional modules are included:

a reality scenario image obtaining module 901, configured to obtain a reality scenario image acquired by an image acquirer;

an image fusion module 902, configured to fuse the reality scenario image with a pre-generated virtual scenario image, to obtain a fusion image, the virtual scenario image comprising a virtual object image and/or a virtual role image; and a display module 903, configured to display the fusion image.

In some implementations, the image acquirer may be a camera. The reality scenario image obtaining module 901 is specifically configured to: shoot a scenario picture or a scenario video in the real world by using the camera, and use the scenario picture or each frame of picture of the scenario video as a reality scenario image.

In some implementations, the image acquirer may be a holographic scanner. The reality scenario image obtaining module 901 is specifically configured to: scan the real world by using the holographic scanner, to obtain a holographic picture; and use the holographic picture as the reality scenario image.

In some implementations, the apparatus further includes:

an environment parameter obtaining module, configured to obtain an environment parameter; and an image rendering module, configured to render the reality scenario image based on the environment parameter, to obtain a rendered image; and the image fusion module 902 is specifically configured to superimpose the rendered image over the pre-generated virtual scenario image, to generate the fusion image.

In some implementations, the environment parameter obtaining module is specifically configured to obtain the environment parameter entered by a user.

In some implementations, the environment parameter obtaining module is specifically configured to extract the environment parameter from the reality scenario image.

In some implementations, the image rendering module is specifically configured to: when the environment parameter indicates an infrared mode, perform infrared thermal rendering on the reality scenario image, to obtain the rendered image.

In some implementations, the image rendering module is specifically configured to: when the environment parameter indicates a night vision mode, perform night vision rendering on the reality scenario image, to obtain the rendered image.

In some implementations, the image rendering module includes:

a conversion unit, configured to: when the environment parameter indicates an infrared mode, convert the reality scenario image into a grayscale image;

a determining unit, configured to determine a heat value of each pixel based on a grayscale value of each pixel in the grayscale image; and an adjustment unit, configured to perform color adjustment on the grayscale image based on the heat value of each pixel, to obtain the rendered image, wherein in the rendered image, a color temperature of an area with a large heat value is higher than a color temperature of an area with a small heat value.

In some implementations, the image rendering module further includes:

a scaling down unit, configured to scale down the grayscale image based on a scale such as a preset scale, to obtain a temporary picture; and correspondingly, the adjustment unit is specifically configured to perform color adjustment on the temporary picture based on the heat value of each pixel.

Correspondingly, the apparatus further includes:

a scaling up unit, configured to scale up the temporary picture based on the preset scale, to obtain the rendered image.

In some implementations, the image rendering module includes:

an obtaining unit, configured to obtain a central pixel of the reality scenario image;

a calculation unit, configured to calculate a distance between each pixel in the reality scenario image and the central pixel;

a setting unit, configured to set a distortion degree of each pixel based on the distance, to obtain a distorted image, wherein the distortion degree of each pixel is positively related to the distance between the pixel and the central pixel;

a greening unit, configured to process the distorted image by using a green lens, to obtain a greened image; and an addition unit, configured to add a random noise to the greened image, to generate the rendered image.

In some implementations, the apparatus further includes:

a rotation data obtaining module, configured to obtain rotation data of a gyroscope; and an update module, configured to update the virtual role image based on the rotation data.

It is noted that, for information exchange between the foregoing functional modules and units, refer to the descriptions in the system and method embodiments corresponding to FIG. 1 to FIG. 7. Details are not described herein.

In addition, the present disclosure further provides a computer storage medium. The medium stores an application program. When being performed, the program includes some or all of the steps in the augmented reality scenario generation method (the embodiments shown in FIG. 1 to FIG. 7).

An augmented reality game system in the embodiments of the present disclosure may exist in a form of user equipment (such as a mobile phone or a tablet computer). The user equipment in the present disclosure includes a handheld device, an in-vehicle device, a wearable device, a computing device, or various forms of user equipment. The handheld device may be any terminal device such as a mobile phone, a tablet computer, or a Personal Digital Assistant (PDA).

The following describes the user equipment in the embodiments of the present disclosure by using a mobile phone as an example.

Figure 10:
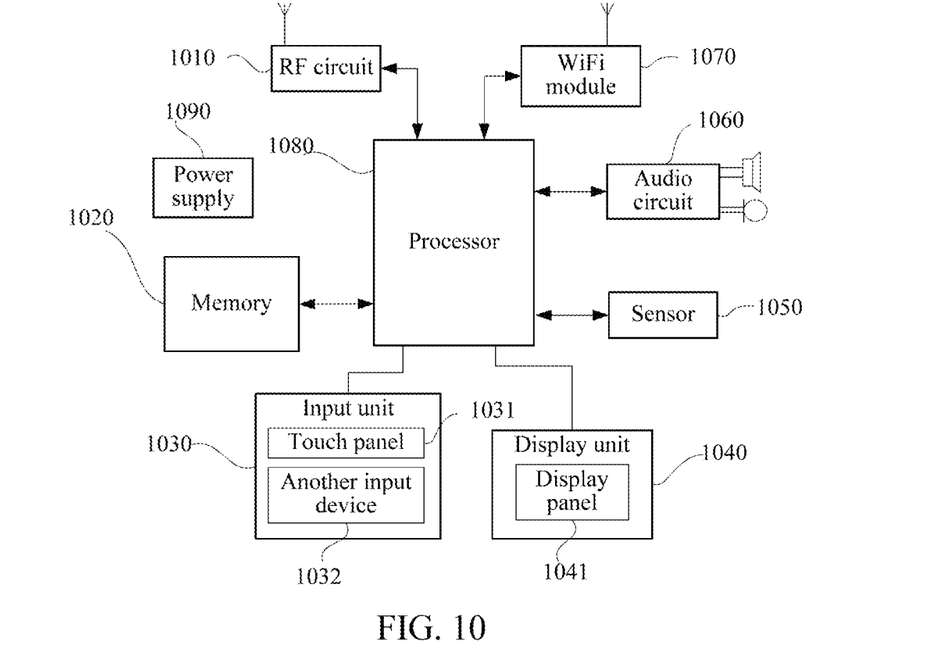
FIG. 10 is a schematic structural diagram of hardware of a system according to an embodiment of the present disclosure.

FIG. 10 is a block diagram of a structure of a part of a mobile phone related to user equipment according to an embodiment of the present disclosure. Referring to FIG. 10, the mobile phone includes components such as a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the art may understand that the structure of the mobile phone shown in FIG. 10 does not constitute a limitation to the mobile phone, and the mobile phone may include more components or fewer components than those shown in the figure, or some components may be combined, or a different component deployment may be used.

The following describes the components of the mobile phone in detail with reference to FIG. 10.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1020 may include a high speed random access memory, and may also include a non-volatile memory, such as at least one magnetic disk storage device, a flash memory, or another volatile solid-state storage device.

In actual application, the application program stored in the memory 1020 performs some or all steps in the methods corresponding to FIG. 1 to FIG. 7. The memory 1020 stores data generated in an execution process of a data game program or stores data entered by a user.

The input unit 1030 may be configured to receive input digit or character information, and generate a keyboard signal input related to the user setting and function control of the mobile phone. The input unit 1030 may include a touch panel 1031 and another input device 1032. The touch panel 1031, which may also be referred to as a touch screen, may collect a touch operation of a user on or near the touch panel 1031 (such as an operation of a user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. Moreover, the touch controller can receive and execute a command sent from the processor 1080. In addition, the touch panel 1031 may be a resistive, capacitive, infrared, or surface sound wave type touch panel. In addition to the touch panel 1031, the input unit 1030 may further include the another input device 1032. The another input device 1032 may include, but is not limited to, one or more of a physical keyboard, a functional key (such as a volume control key and a switch key), a track ball, a mouse, and a joystick.

The touch panel 1031 in this embodiment of the present disclosure receives an input of a player, so that the processor 1080 controls interaction between a virtual object and a virtual role in a virtual scenario.

The display unit 1040 may be configured to display information input by the user or information provided for the user. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, so as to determine a type of a touch event. Then, the processor 1080 provides corresponding visual output on the display panel 1041 according to the type of the touch event. Although, in FIG. 10, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The display panel 1041 in this embodiment of the present disclosure is configured to display a fusion image.

WiFi is a short distance wireless transmission technology. The mobile phone may help, by using the WiFi module 1070, the user to receive and send e-mails, browse a web page, access streaming media, and so on, which provides wireless broadband Internet access for the user. Although FIG. 10 shows the WiFi module 1070, it may be understood that the WiFi module 1070 is not a necessary component of the mobile phone, and when required, the WiFi module 1070 may be omitted as long as the scope of the essence of the present disclosure is not changed.

The processor 1080 is the control center of the mobile phone, and is connected to various parts of the mobile phone by using various interfaces and lines. By running or executing the software program and/or module stored in the memory 1020, and invoking data stored in the memory 1020, the processor 1080 performs various functions and data processing of the mobile phone, thereby performing overall monitoring on the mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the foregoing modem may either not be integrated into the processor 1080.

The processor 1080 in the embodiments of the present disclosure is configured to perform the application program in the memory 1020, to perform some or all steps performed by the processor in the embodiments in FIG. 1 to FIG. 7.

The mobile phone may further include at least one sensor 1050 such as an optical sensor, a motion sensor, and other sensors. The optical sensor may include an ambient light sensor and a proximity sensor, where the ambient light sensor may adjust luminance of the display panel 1041 according to the luminance of the ambient light, and the proximity sensor may switch off the display panel 1041 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The mobile phone further includes the power supply 1090 (such as a battery) for supplying power to the components.

Although not shown in the figure, the mobile phone may further include a camera, a Bluetooth module, and the like, which are not further described herein.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it is understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

If implemented in the form of software functional units and sold or used as an independent product, the integrated units may be stored in a computer-readable storage medium. Based on such understanding, a technical solution of the present disclosure essentially or a portion that is of the technical solution of the present disclosure and that has contributions to the related technology or all of or a portion of the technical solution may be embodied in a software product form. The computer software product is stored in a storage medium, and comprises several instructions used to make one computer device (which may be a personal computer, a server, a network device, or the like) perform all or some steps of the method in the embodiments of the present disclosure. The foregoing storage medium includes: any medium that can store program code, such as a USB flash memory drive, a removable hard disk, a read-only memory (ROM, Read-Only Memory), a random access memory (RAM, Random Access Memory), a magnetic disk, or an optical disc.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

The above embodiments are merely provided for describing the technical solutions of the present disclosure, but are not intended to limit the present disclosure. It is understood by persons of ordinary skill in the art that although the present disclosure has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of the present disclosure.

What is claimed is:

1. A method for augmented reality in an augmented reality game, comprising:
    obtaining, by processing circuitry of an apparatus and via an imaging device, first image data of a first image that is taken of a surrounding environment of the apparatus;
    obtaining an environment parameter that is indicative of a rendering mode, including an infrared mode, a night vision mode, a cartoon mode, or a sketch mode;
    performing, by the processing circuitry, a set of image processing operations associated with the rendering mode on the first image data of the first image to obtain a rendered background image that has a visual effect indicated by the rendering mode;
    analyzing the first image to identify a virtual object in the augmented reality game according to at least one element in the first image;
    generating, by the processing circuitry executing a game engine of the augmented reality game, a second image that includes a virtual role image of a virtual role and a virtual object image of the virtual object in the augmented reality game, the virtual role representing a user and controllable by the user to interact with the virtual object in the augmented reality game;
    combining the rendered background image and the second image to obtain a fusion image;
    controlling, by the processing circuitry, a display screen to display the fusion image;
    receiving a user operation corresponding to an interaction between the virtual role and the virtual object in the augmented reality game;
    updating, by the processing circuitry executing the game engine of the augmented reality game, the second image to obtain an updated second image showing the interaction by at least adjusting the virtual role image according to the user operation; and
    updating the fusion image for display according to the updated second image.

2. The method according to claim 1, further comprising at least one of:
    controlling a camera to take the first image of the surrounding environment and provide the first image data of the first image to the processing circuitry; and
    controlling a holographic scanner to scan the surrounding enviroment to generate the first image data.

3. The method according to claim 1, wherein, when the environment parameter is indicative of the infrared mode, the performing the set of image processing operations associated with the rendering mode on the first image data of the first image comprises:
    converting the first image into a grayscale image;
    determining respective first heat values of first pixels in the grayscale image based on first grayscale values of the first pixels in the grayscale image; and
    performing a first color adjustment on the grayscale image based on the first heat values of the first pixels, to obtain the rendered background image, the first color adjustment converting a relatively higher heat value to a color of a relatively higher color temperature.

4. The method according to claim 1, when the environment parameter is indicative of the infrared mode, the performing the set of image processing operations associated with the rendering mode on the first image data of the first image comprising:
    converting the first image into a grayscale image;
    scaling down the grayscale image based on a scale to obtain a temporary image;
    determining respective second heat values of second pixels in the temporary image based on second grayscale values of the second pixels in the temporary image;
    performing a second color adjustment on the temporary image based on the second heat values of the second pixels to obtain a color-adjusted temporary picture; and
    scaling up the color-adjusted temporary picture based on the scale, to obtain the rendered background image.

5. The method according to claim 1, wherein, when the environment parameter is indicative of the night vision mode, the performing the set of image processing operations associated with the rendering mode on the first image data of the first image comprises:
    obtaining a central pixel of the first image;
    calculating distances between pixels in the first image and the central pixel;
    setting respective distortion degrees of the pixels based on the distances to obtain a distorted image, the distortion degrees being positively correlated to the distances;
    green-lens processing the distorted image to obtain a greened image; and
    adding a random noise to the greened image to generate the rendered background image.

6. The method according to claim 1, further comprising:
    receiving rotation data that is detected by a gyroscope; and
    updating the second image by adjusting the virtual role image to reflect a rotation of the virtual role based on the rotation data.

7. The method according to claim 1, wherein the obtaining the environment parameter comprises:
    determining the environment parameter according to an analysis of the first image.

8. An apparatus, comprising:
    an imaging device configured to generate first image data of a first image that is taken of a surrounding environment of the apparatus; and processing circuitry configured to
obtain an environment parameter that is indicative of a rendering mode, including an infrared mode, a night vision mode, a cartoon mode, or a sketch mode,
perform a set of image processing operations associated with the rendering mode on the first image data of the first image to obtain a rendered background image that has a visual effect indicated by the rendering mode,
analyze the first image to identify a virtual object in an augmented reality game according to at least one element in the first image;
generate, by a game engine of an augmented reality game, a second image that includes a virtual role image of a virtual role and a virtual object image of the virtual object in the augmented reality game, the virtual role representing a user and controllable by the riser to interact with the virtual object in the augmented reality game,
combine the rendered backgroumd image and the second image to obtain a fusion image,
receive a user operation corresponding to an interaction between the virtual role and the virtual object in the augmented reality game,
update, by the game engine of the augmented reality game, the second image to obtain an updated second image showing the interaction by at least adjusting the virtual role image according to the user operation, and
update the fusion image for display according to the updated second image; and
a display device configured to display the fusion image.

9. The apparatus according to claim 8, wherein the imaging device comprises at lust one of:
a camera configured to take the first image of the surrounding environment; and
a holographic scanner configured to scan the surrounding environment to generate the first image data of the first image.

10. The apparatus according to claim 8, wherein the processing circuitry is configured to:
when the environment parameter is indicative of the infrared mode,
convert the first image into a grayscale image,
determine respective first heat values of first pixels in the grayscale image based on first grayscale values of the first pixels in the grayscale image, and
perform a first color adjustment on the grayscale image based on the first heat values of the first pixels to obtain the rendered back round image, the first color adjustment converting a relatively higher heat value to a color of a relatively higher color temperature.

11. The apparatus according to claim 8, wherein the processing circuitry is configured to:
when the environment parameter is indicative of the infrared mode,
convert the first image into a grayscale image,
scale down the gayscale image based on a scale to obtain a temporary image,
determine respective second heat values of second pixels in the temporary image based on second grayscale values of the second pixels in the temporary image,
perform a second color adjustment on the temporary image based on the second heat values of the second pixels to obtain a color-adjusted temporary picture, and
scale up the color-adjusted temporary picture based on the scale, to obtain the rendered background image.

12. The apparatus according to claim 8, wherein the processing circuitry is configured to:
when the environment parameter is indicative of the night vision mode,
obtain a central pixel of the first image,
calculate distances between pixels in the first image and the central pixel,
set respective distortion degrees of the pixels based on the distances to obtain a distorted image, the distortion degrees being positively correlated to the distances,
green-lens process the distorted image to obtain a greened image, and
add a random noise to the greened image to generate the rendered background image.

13. The apparatus according to claim 8, wherein the processing circuitry is configured to:
receive rotation data that is detected by a gyroscope; and
update the second image by adjusting the virtual role image to reflect a rotation of the virtual role based on the rotation data.

14. A non-transitory computer-readable medium storing instructions which when executed by a computer cause the computer to perform:
obtaining first image data of a first image that is taken of a surrounding environment of the computer;
obtaining an environment parameter that is indicative of a ren Bring mode including an infrarded mode, a night vision mode, a cartoon mode, or a sketch mode;
performing a set of image processing operations associated with the rendering mode on the first image data of the first image to obtain a rendered background image that has a visual effect indicated by the rendering mode;
analyzing the first image to identify a virtual object in an augmented reality game according to at least one element in the first image;
generating, by a game engine of an the augmented reality game, a second image that includes a virtual role image of a virtual role and a virtual object image of the virtual object in the augmented reality game, the virtual role representing a user and controllable by the user to interact with the virtual object in the augmented reality game;
combining the rendered background image and the second image to obtain a fusion image;
controlling a display screen to display the fusion image;
receiving a user operation corresponding to an interaction between the virtual role and the virtual object in the augmented reality game;
updating, by the game engine of the augmented reality game, the second image to obtain an updated second image showing the interaction by at least adjusting the virtual role image according to the user operation, and
updating the fusion image for display according to the updated second image.

15. The non-transitory computer-readable medium according to claim 14, wherein the instructions cause the computer to perform at least one of
controlling a camera to take the first image of the surrounding environment and provide the first image data of the first image to the computer; and
controlling a holographic scanner to scan the surrounding environment to generate the first image data.

16. The non-transitory computer-readable medium according to claim 14, wherein, when the environment parameter is indicative of the infrared mode, the peifo ling the set of image processing operations associated with the rendering mode on the first image data of the first image comprises:
- converting the first image into a grayscale image;
- determining respective first heat values of first pixels in the grayscale image based on first grayscale values of the first pixels in the grayscale image; and
- performing a first color adjustment on the grayscale image based on the first heat values of the first pixels, to obtain the rendered background image, the first color adjustment converting a relatively higher heat value to a color of a relatively higher color temperature.

17. The on-transitory computer-readablemedium according to claim 14, wherein, when the environment parameter is indicative of the infrared mode, the performing the set of image processing operations associated with the rendering erode on the first im age data of the first image comprises:
- converting the first image into a grayscale image;
- scaling down the grayscale image based on a scale to obtain a temporary image;
- determining respective second heat values of second pixels in the temporary image based on second g,rayscale values of the second pixels in the temporary image;
- performing a second color adjustment ori the temporary image based on the second heat values of the second pixels to obtain a color-adjusted temporary picture; and
- scaling up the color-adjusted temporary picture based on the scale, to obtain he rendered background image.

18. The non-transitory computer-readablemedium according to claim 15, wherein, when the environment parameter is indicative of the night vision mode, the performing the set of image processing operations associated with the rendering mode on the first image data of the first image comprises:
- obtaining a central pixel of the first image;
- calculating distances between pixels in the first image and the central pixel;
- setting respective distortion degrees of the pixels based on the distan to obtain a distorted image, the distortion degrees being positively correlated to the distances;
- green-lens processing the distorted image to obtain a greened image; and
- adding a random noise to the greened image to generate the rendered background image.

19. The non-transitory computer-readable medium according to claim 14, wherein the instructions cause the computer to perform:
- receiving rotation data that is detected by a gyroscope; and
- updating the second image by adjusting the virtual role image to reflect a rotation of the virtual role based on the rotation data.

\* \* \* \* \*